Patented Oct. 2, 1951

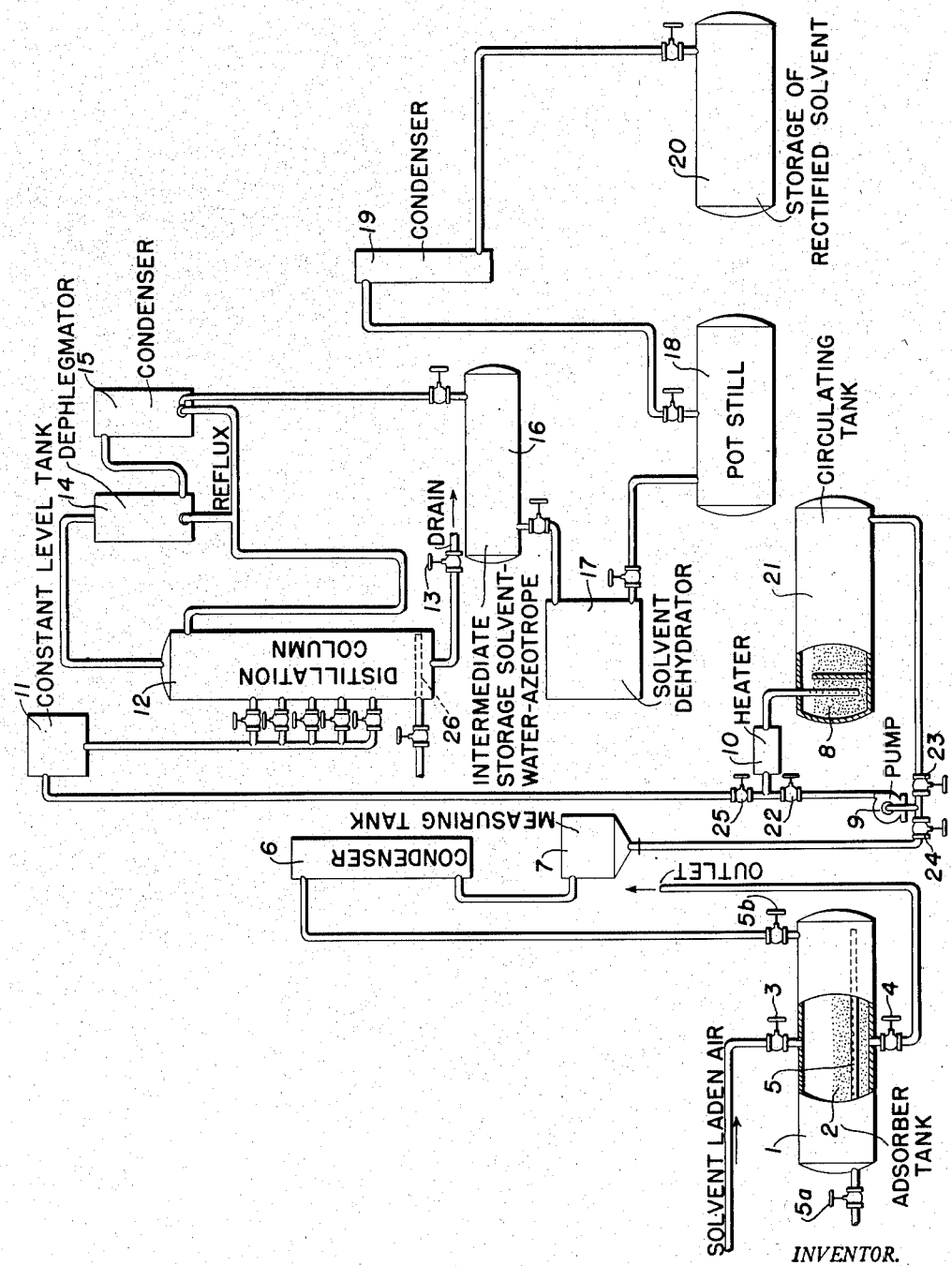

UNITED STATES PATENT OFFICE 2,570,157

PURIFICATION OF KETONE-CONTAINING LIQUID

Ernest A. Rodman, Newburgh, N. Y., assignor to E. I. du Pont de Nemours & Company, Wilmington, Del., a corporation of Delaware Application June 4, 1946, Serial No. 674,343

4 Claims. (Cl. 260—593)

This invention relates to a process for the purification of organic liquids and particularly to the removal of diketones from organic liquids.

In the manufacture of coating compositions, ketones are widely employed as a solvent or a portion of the organic solvent for the film forming components of the coating compositions. In certain industrial processes such as the coating of fabrics, automobile bodies, etc., with film forming compositions it is common practice to recover the organic solvents after the composition has been applied to whatever surface is being coated. The solvent recovery is generally accomplished by drawing air and the organic solvent vapors into an enclosed tank containing a bed of activated carbon. The organic solvent or solvent mixture is adsorbed by the activated carbon. As soon as the carbon bed becomes saturated, the solvent is steam distilled from the carbon beds and the distillate of water and organic solvents is then rectified or separated into the individual components by distillation.

In the recovery of organic solvents containing ketones having 4 or more carbon atoms, even in small proportions, the activated carbon acts as a catalyst in the oxidation of the ketone to diketones as indicated by the following typical reaction in which methyl ethyl ketone is oxidized to diacetyl:

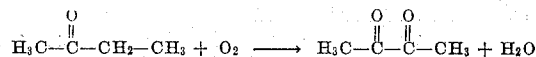

The reaction between the ketone and oxygen will also take place in the absence of a catalyst such as activated carbon when the ketone is brought in contact with oxygen at elevated temperatures. The diketones in contradistinction to the colorless aliphatic monoketones are yellow volatile liquids with a penetrating quinone-like odor. The presence of diketones in organic solvent is objectionable for several reasons, such as, objectionable color, its chemical reactivity, and its undesirable physiological effect on some individuals coming in contact with the diketones.

It is generally impossible to remove diketones from the monoketones, from which they are formed by oxidation, by the process of distillation due to the formation of azeotropes.

The primary object of this invention is the provision of a method for the removal of diketones from organic solvents and more particularly the removal of diacetyl from organic solvents. A still more particular object is the removal of diacetyl from methyl ethyl ketone.

These objects are accomplished by the reduction of the diketone in the presence of an organic solvent or mixture of organic solvents by treatment with nascent hydrogen, and separating by distillation the organic solvents from the reduction products.

In the drawing the single figure is a flow sheet for the treatment of organic liquids in accordance with this invention. Throughout the description of the invention the numerical references correspond to the numerals in the drawing.

The following detailed description is given by the way of illustration and not limitation.

In the manufacture of vinyl resin coated fabrics methyl ethyl ketone is used as the solvent for forming a solution of the vinyl resin. The vinyl resin coating composition usually comprises polyvinyl chloride, pigments, plasticizers, and methyl ethyl ketone. The coated fabric is passed through a heated chamber immediately after each successive coat to evaporate the methyl ethyl ketone. The mixture of methyl ethyl ketone vapor and air including some water vapor is drawn into a closed tank 1 with a bed of activated carbon 2. The methyl ethyl ketone is adsorbed by the activated carbon. When the activated carbon bed becomes saturated, it is then closed off from the source of solvent vapor by means of valves 3 and 4, and air and steam are introduced through valve 5a into the tank below the carbon bed through sparger 5 to steam distill the solvent vapor which is passed through valve 5b into a water cooled condenser 6 where the condensate of water and solvent vapors are collected.

The activated carbon acts as a catalyst to accelerate the oxidation of methyl ethyl ketone to diacetyl, particularly at elevated temperatures. Also formed along with the diacetyl are some acidic products, particularly acetic acid, by the decomposition of methyl ethyl ketone. The diacetyl is a yellow colored material which forms an azeotrope with methyl ethyl ketone and cannot be separated by conventional distillation methods. Besides imparting a yellow color to the recovered solvent the diacetyl will produce undesirable physiological effects on individuals coming in contact with it. As little as 0.01% of dicetyl in methyl ethyl ketone is sufficient to result in the undesirable yellow color to the latter.

The distillate, containing methyl ethyl ketone, diacetyl, acid decomposition products, and water, is collected from the condenser 6 and passed through a measuring tank 7 and is then circulated through a bed of mossy zinc metal 8 in one end of tank 21 by means of pump 9. The fluid mixture is circulated through the zinc bed 8 by means of a pump 9 and opening valves 22 and 23 and closing valves 24 and 25, and passed through a heater 10 to raise the temperature of the fluid mixture up to about 125° C. The heated fluid mixture is circulated through the zinc bed 8 until the diacetyl content is reduced to about .001%. The acid components of the liquid being treated react with the zinc to form nascent hydrogen which reduces the diacetyl to less volatile products from which the methyl ethyl ketone can be separated by distillation. It is believed that the reduction takes place in a manner as outlined below:

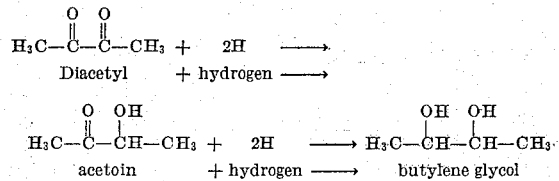

The reaction between the acid products and zinc to liberate nascent hydrogen, which reduces the diacetyl to butylene glycol and acetoin as indicated above, is accelerated at elevated temperatures. For the purpose of this invention the optimum temperature appears to be 45° C. (113° F.). In any event the temperature of the liquid being circulated through the zinc bed should not exceed the boiling point of the liquid.

The methyl ethyl ketone and water form an azeotrope (88.7% methyl ethyl ketone–11.3% water) which boils at 73.4° C. and is separated from the reduction products by distilling in column 12, heated by sparger 26, after passing through the constant level tank 11. The residue consists of the reduction products and water. The reduction products being water soluble are washed free from the still when the residue is drained through valve 13. The distillate consisting of the azeotrope of methyl ethyl ketone and water is water white and free from the objectionable decomposition products of methyl ethyl ketone. The distillate from column 12 passes through the dephlegmator 14 and condenser 15 and the azeotrope is collected in tank 16. The azeotrope of methyl ethyl ketone and water is treated in tank 17 with calcium chloride or other dehydrating agents to remove substantially all the water. The water content of the azeotrope is reduced to below 1% by this treatment. To dehydrate the methyl ethyl ketone further, it is again distilled in pot still 18, heated by means of steam coils 27, and the remaining 1% or less of water comes over as an azeotrope with methyl ethyl ketone as the first fraction which is returned for dehydration and again treated. The substantially pure methyl ethyl ketone passes through condenser 19 and is collected in storage tank 20.

While the above description alludes to the purification of methyl ethyl ketone, the invention can also be used in purifying other solvents which contain diketones, such as alcohols, esters, hydrocarbons and ketones or mixtures thereof. In a solvent recovery system where the carbon beds are used alternately with methyl ethyl ketone and a mixture of ethyl alcohol and ethyl acetate, the alcohol-ester mixture will become admixed with methyl ethyl ketone. The methyl ethyl ketone present in the solvent mixtures will oxidize to diacetyl and impart a yellow color to the reclaimed solvents. The diacetyl can be removed from the solvent mixtures by the same reduction process as outlined above for the purification of methyl ethyl ketone.

In the case of the purification of mixtures of ethyl alcohol and ethyl acetate containing diacetyl resulting from the oxidation of methyl ethyl ketone, the process comprises circulating the liquid to be purified which is slightly acid in a tank containing mossy zinc metal. The acid present in the liquid being purified results from the hydrolysis of a small amount of ethyl acetate, the oxidation of a small amount of the alcohol to acetaldehyde and acetic acid, and oxidation of a portion of the diacetyl. The acidic material reacts with the zinc liberating nascent hydrogen which reduces the diacetyl as outlined above. The products of the reduction of diacetyl as well as the hydrolysis of diacetyl are separated from the ethyl alcohol, ethyl acetate and other solvents by rectification or distillation as outlined above for the purification of methyl ethyl ketone.

While the preferred embodiment of the invention is the purification of organic solvents containing diacetyl, the invention is also useful for the separation from organic liquids of other diketones and ketoaldehydes formed by the oxidation of monoketones other than methyl ethyl ketone. The diketones and ketoaldehydes formed by the oxidation of monoketones which may be separated from other organic liquids by this invention as outlined above are those formed by the oxidation of monoketones as represented by the following formula:

where R is hydrogen or an alkyl radical having one or more carbon atoms.

It will be readily apparent that many widely different embodiments of this invention may be made without departing from the spirit and scope thereof; and, therefore, it is not intended to be limited except as indicated in the appended claims.

I claim:

1. The method of purifying organic liquids comprising in predominating amount methyl ethyl ketone and a volatile saponifiable ester and containing a small amount of free acid and a relatively small amount of diacetyl as an impurity which comprises reducing the said diacetyl but not the main body of the organic liquid with nascent hydrogen, produced by reaction of the said acid and a metal, to a mixture of butylene glycol and acetoin, and thereafter separating the said organic liquid from the reduction products by fractional distillation.

2. The method of claim 1 in which the organic liquid is primarily methyl ethyl ketone.

3. The method of claim 1 in which the organic liquid contains a small amount of acetic acid and the nascent hydrogen is produced by reacting the acetic acid with zinc metal.

4. The method of claim 1 in which the reduction takes place at about 45° C.

ERNEST A. RODMAN.

REFERENCES CITED

The following references are of record in the file of this patent:

UNITED STATES PATENTS

| Number | Name | Date |
|---|---|---|
| 1,089,775 | Lindner | Mar. 10, 1914 |
| 1,681,238 | James | Aug. 21, 1928 |
| 1,979,303 | Woodhouse | Nov. 6, 1934 |
| 2,205,184 | Woodhouse | June 18, 1940 |
| 2,276,142 | Atwood | Mar. 10, 1943 |
| 2,429,484 | Peters | Oct. 21, 1947 |

OTHER REFERENCES

Peckmann: Berichte, vol. 21, pages 1411–1422 (1888); vol. 22, pages 2214–15 (1889); vol. 23, pages 2421–2427 (1890).

Englund: J. für Praktische Chemie, Second Series, vol. 124, pages 191–208 (only page 193 necessary) (1930).